United States Patent [19]

Feridun

[11] Patent Number: 5,898,832
[45] Date of Patent: Apr. 27, 1999

[54] PROCESSING OF MULTIPLE MANAGED OBJECTS

[75] Inventor: Metin Feridun, Thalwil, Switzerland

[73] Assignee: International Business Machines Corporation, Armonk, N.Y.

[21] Appl. No.: 08/704,458

[22] Filed: Aug. 15, 1996

[30] Foreign Application Priority Data

Aug. 18, 1995 [WO] WIPO ................ PCT/IB95/00663

[51] Int. Cl.$^6$ .................... G06F 13/00; G06F 13/14
[52] U.S. Cl. .................. 395/200.33; 395/651; 395/652; 395/676
[58] Field of Search .................... 395/651, 652, 395/702, 726, 653, 676, 683, 200.33; 707/103, 10

[56] References Cited

U.S. PATENT DOCUMENTS

| | | | |
|---|---|---|---|
| 4,274,139 | 6/1981 | Hodgkinson et al. | 364/200 |
| 5,247,676 | 9/1993 | Ozur et al. | 395/650 |
| 5,261,097 | 11/1993 | Saxon | 395/650 |
| 5,319,782 | 6/1994 | Goldberg et al. | 395/650 |
| 5,367,635 | 11/1994 | Bauer et al. | 395/200.51 |
| 5,377,350 | 12/1994 | Skinner | 395/683 |
| 5,430,876 | 7/1995 | Schreiber et al. | 395/650 |
| 5,522,077 | 5/1996 | Cuthbert et al. | 395/700 |
| 5,526,524 | 6/1996 | Madduri | 395/726 |
| 5,701,470 | 12/1997 | Joy et al. | 395/614 |
| 5,706,515 | 1/1998 | Connelly et al. | 395/676 |

FOREIGN PATENT DOCUMENTS

| | | | |
|---|---|---|---|
| 0381655 | 8/1990 | European Pat. Off. | G06F 9/46 |
| 0463764 | 2/1992 | European Pat. Off. | G06F 9/46 |

*Primary Examiner*—Frank J. Asta
*Assistant Examiner*—Ivan C. Pierce, III
*Attorney, Agent, or Firm*—Joscelyn G. Cockburn

[57] ABSTRACT

This invention concerns a method for organizing the execution of Common Management Information Protocol (CMIP) requests in an Open Systems Interconnection (OSI) environment by providing main threads and sub-threads within each main thread for simultaneous processing of multiple CMIP requests. In brief, a main thread is started sequentially for executing incoming CMIP requests, the main thread checks whether a particular managed object is available, i.e. not locked, lock it, and starts a sub-thread to process the CMIP request in this managed object. This allows the main thread to start another sub-thread, thus providing for the parallel execution of a plurality of CMIP requests.

12 Claims, 5 Drawing Sheets

PROCESSING OF MULTIPLE MANAGED OBJECTS

The present invention is concerned with the handling of Common Management Information Protocol (CMIP) requests in an Open Systems Interconnection (OSI) environment, and in particular with the execution of such CMIP requests in so-called OSI agents when several requests are received or pending concurrently.

BACKGROUND

The OSI (Open Systems Interconnection) systems management is a standard that provides mechanisms for the monitoring, control, and coordination of resources such as storage units, databases, telecommunication switches, communication links, etc., within the OSI environment and OSI protocol standards for communicating information pertinent to those resources.

The OSI management standards define an "agent" as an application entity that provides a standardized access to a resource, and a "manager" as an application entity that performs management functions. A resource is represented using standardized "managed object classes" and each instantiation of a class is called a "managed object instance". For example, one managed object class may be a generally defined type of disk unit, and each individual disk unit of that type then is one instance of this class. The various operations in such a system are governed by a "Common Management Information Protocol" or short CMIP.

A manager application executes management operations on managed object instances contained in an agent by sending CMIS (Common Management Information Services) service requests to that agent over the network using the CMIP protocol. Such service requests may include the following operations: create, delete, set, get, action, cancel-get. The agent returns responses and events to the manager, also using the CMIP protocol. The configuration of such an OSI environment is shown generally in FIG. 1, including, besides the communication network 1, an OSI manager 2, OSI agent 3 with agent kernel 4, managed object instances 5-$a$, 5-$b$, 5-$i$, 5-$n$, resources 6-$a$, 6-$b$ to be accessed, and the flow of CMIP protocol messages. The OSI MANAGER 2 could be loaded on a convention computer system 2' while the agent 3 and related components are loaded on conventional computer system 3'.

The OSI Systems Management standards and the related CMIP protocol and CMIS services are described in the following publications:

ISO/IEC 10040, Information Technology—Open Systems Interconnection—Systems Management Overview, 1991.

ISO/IEC 9595, Information Technology—Open Systems Interconnection—Common Management Information Service Definition, 1991.

ISO/IEC 9596, Information Technology—Open Systems Interconnection—Common Management Information Protocol Definition, 1991.

ISO/IEC 10165-1, Information Technology—Open Systems Interconnection—Structure of Management Information—Part 1: Management Information Model, 1992.

ISO/IEC 10165-2, Information Technology—Open Systems Interconnection—Structure of Management Information—Definition of Management Information, 1992.

ISO/IEC 10165-4, Information Technology—Open Systems Interconnection—Guidelines for the Definition of Managed Objects, 1992.

Multiple managers can be connected to an agent at the same time, and each can send CMIP requests to the agent asynchronously. This results in the following problem:

An OSI agent can receive multiple CMIP requests from multiple sources. Some of these requests may incur long processing times—a typical example is a CMIP "get" request to a managed object instance which may result in a resource access (establish connection, wait for response, close connection). Servicing CMIP requests sequentially may therefore cause long delays and thus may result in poor performance.

Some help in the organization of servicing requests and accessing resources may be the use of "threads", a thread being a single flow of control within a process, each thread having its own thread identifier (ID) and the required resources to support a flow of control. In this context, a function is provided called "mutex" (mutual exclusion) which allows multiple threads to serialize their access to shared data: a thread can lock a mutex and thereby becomes its owner until that same thread unlocks the mutex.

A description and definition of threads are given in the following publications:

A. Birrell: "An Introduction to Programming with Threads", in "Systems Programming with Modula3", G. Nelson (Ed.), Prentice Hall, 1991, pp. 88–118;

Draft Standard for Information Technology—Portable Operating System Interface (POSIX)—Part 1: Systems Application Program Interface (API), Amendment 2: Threads Extension; IEEE, October 1993.

U.S. Pat. No. 5,247,676 "RPC Based Computer System Using Transparent Callback and Associated Method", disclosing a first calling thread, a second called thread, and helper threads. However, this patent concerns remote procedure calls (RPCs) and callbacks within a computer system, and not the problem of handling multiple CMIP requests in an OSI environment.

The utilization of threads and the mutex function as presented in the prior art do allow serialization of accesses but per se do not solve the above stated problem of possible long delays and poor performance when multiple CMIP requests are received and resources have to be accessed.

OBJECTS OF THE INVENTION

It is therefore an object of the invention to devise a method for the execution of CMIP requests which allows the handling of multiple CMIP requests by an agent without undue delays.

It is a further object to provide a method for CMIP request execution which uses threads but avoids the disadvantages incurred when the locking of objects result in long delays due to mutual exclusion.

These and other objects are achieved by the method defined in the claims.

An embodiment of the invention is described in the sequel with reference to following drawings.

LIST OF FIGURES

DETAILED DESCRIPTION

Basics of the Invention

Figure 1:
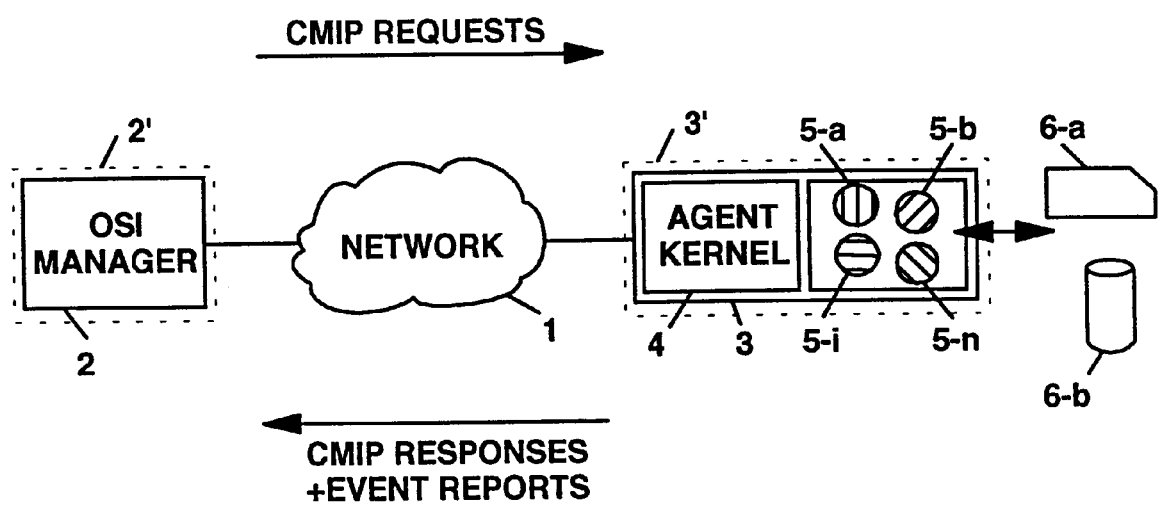
FIG. 1 is a schematic representation of an OSI environment including at least one manager, at least one agent with managed objects, resources, and CMIP protocol flows between a manager and an agent.
Figure 2:
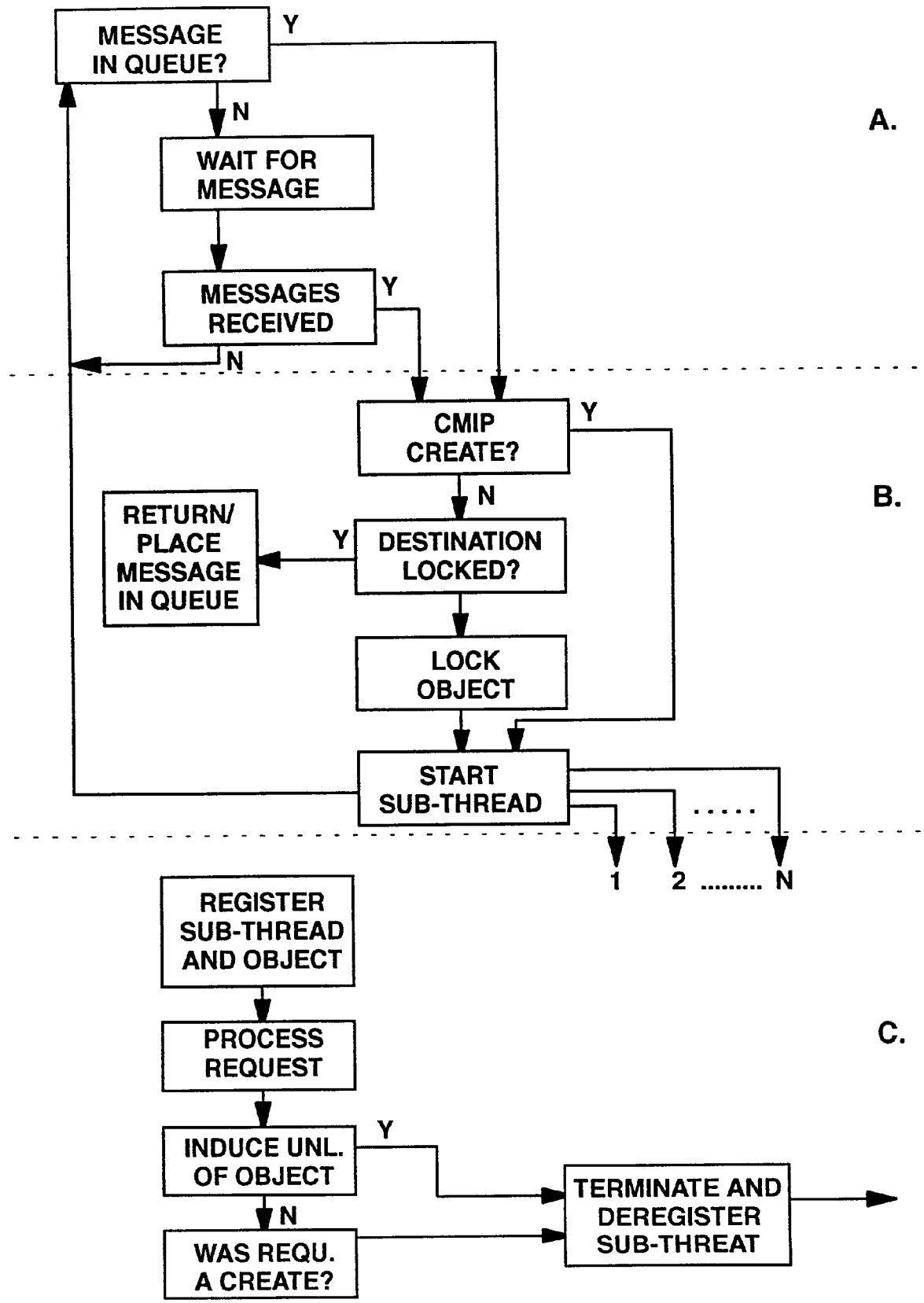
FIG. 2 is a flow diagram of the method as invented, showing the operations in the main thread and in sub-threads.
Figure 3:
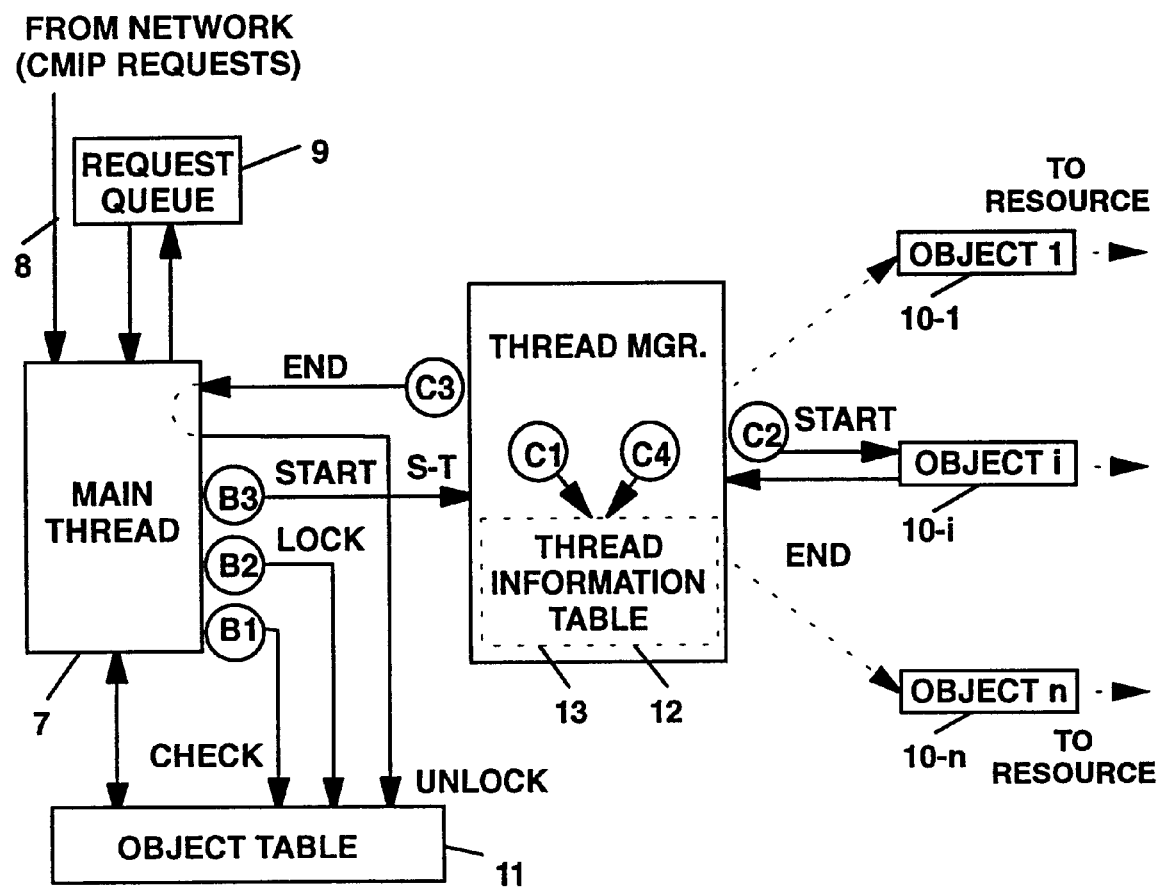
FIG. 3 is a schematic block diagram showing the interaction of various portions of an OSI agent in which the invention is used.

Details of the invention are now described in connection with FIGS. 2 and 3. FIG. 2 is a flow diagram illustrating the operations performed in an OSI agent when handling CMIP requests, and FIG. 3 shows the interaction of different portions of an OSI agent for CMIP request handling.

The gist of the invention is as follows. Each agent has a "main thread" that is always active and performs a message dispatching function. It reads messages from the network, and extracts messages (if any) from an internal request queue that is provided for the main thread. For each CMIP request that is to be executed in the agent, a separate sub-thread is started. In order to prevent access to a managed object instance by more than one sub-thread, each managed object instance has a lock. An object instance is locked for one sub-thread as long as the respective CMIP request is being executed, and is unlocked when processing is complete. Note that below and in the claims, the term "object" is used for designating a "managed object instance".

The following procedures are performed in an agent (cf. FIG. 2).

A. Basic Procedure for the Main Thread:
  1. Check whether there are any messages in the queue. For each message in the internal request queue, perform procedure B described below. If there are no messages queued, proceed to step 2.
  2. Wait for a CMIP request from the network. When a message is received, perform procedure B described below, and then go back to step 1.

B. Request Handling Procedure for the Main Thread:
  1. If the request is a CMIP Create, go to step 3. Otherwise, check whether the destination object is locked. If object is unlocked, continue with step 2. If locked, place message into the internal request queue (and return to procedure A).
     Note that in the last step, either a message previously extracted from the internal request queue is put back into the queue, or a message newly received from the network is placed newly into the queue.
  2. Lock object.
  3. Start sub-thread.
  4. Return to procedure A.

C. Procedure for Sub-Threads:
  1. Register sub-thread and the object it is working on with the thread manager.
  2. Process request.
  3. If request is NOT CMIP Create, induce main thread to unlock object.
  4. Terminate sub-thread, de-registering it from the thread manager.

FIG. 3 shows different portions in one OSI agent and their interaction. A main thread 7 is provided for handling CMIP requests received from the communication network on input 8, or CMIP requests that are temporarily stored in request queue 9. The CMIP requests are to be processed in managed objects 10-1 . . . 10-i . . . 10-n, which in turn are connected to resources (storage units, switches, etc.). Thread manager 7 maintains an object table 11 in which each active managed object is registered.

As can be seen from the block diagram of FIG. 3, a "thread manager" 12 is provided in each OSI agent to keep track of the active sub-threads and the objects each thread has locked and not yet unlocked (released). For this purpose, a "thread information table" 13 is maintained which lists for each active thread any object that the said thread has locked. By this, it can also be prevented that a sub-thread attempts to lock an object which was already locked for itself. (Cf. also details in the later section on "multithreading".)

The locking status of each object is maintained in the "object table" 11 shown in FIG. 3. This table contains a list of all objects present in the agent. For each object entry in the table, the locking status of the object (locked/unlocked) is indicated. A new entry is added to the object table when an object is created. Likewise, when an object is deleted from the agent, the corresponding entry in the object table is also deleted.

The reason for NOT locking a managed object when the request is a CMIP Create is simply because the Create request is not directed at an object, but rather instructs the agent to create one. After the creation of the object, other CMIP operations can be sent to this object, and for those operations, the object will have to be locked.

OSI System Management Example

Figure 4:
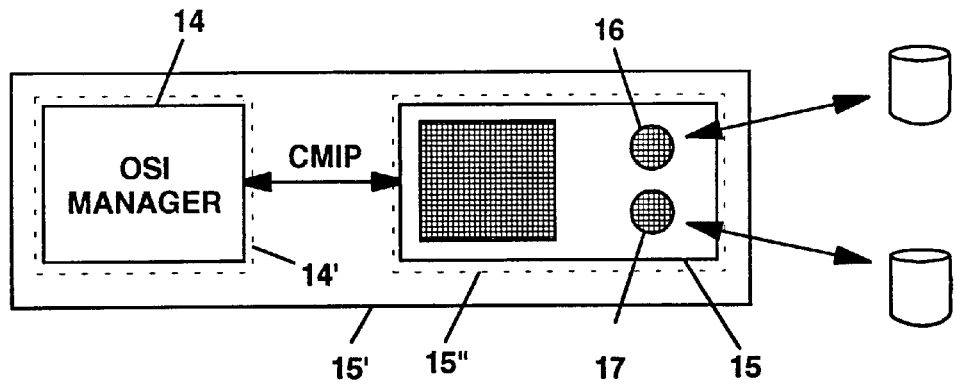
FIG. 4 is a block diagram of a particular example of an OSI system in which the invention is used.

One specific example of an application of the invention is now described in connection with FIG. 4. The purpose of this example is to illustrate a simple case of OSI systems management where two disk drives have to be managed. For the purpose of the example, the disk drives are assumed to be "intelligent", i.e. each is equipped with processing capability to check consistency of its contents on command. FIG. 4 shows the configuration of the system. This configuration includes OSI manager 14, OSI agent 15 with managed objects 16, 17 and, as resources, disk drives 18, 19 (disk-1 and disk-2). The OSI manager 14 and OSI agent 15 with managed objects 16 and 17 could be provided in a single conventional computer system 15' or multiple computer systems 14' and 15". Such computer systems, including keyboards, display operating systems, application program, ROM, RAM etc. are so well known in the prior art that further description is not warranted. As required by OSI, an object class is defined to represent or model a disk drive. Using OSI formalities (GDMO and ASN. 1), an object class "disk" can be defined as follows (unnecessary details omitted):

--- disk MANAGED OBJECT CLASS
DERIVED FROM top;
. . .
ATTRIBUTES
    checkdisk GET-REPLACE . . . ;
REGISTERED AS {1 3 18 0 2 4 5 1};
checkdisk ATTRIBUTE
WITH ATTRIBUTE SYNTAX INTEGER;
BEHAVIOUR
    checkdiskBehaviour BEHAVIOUR -continued DEFINED AS
"When set to 1, it will perform disk consistency check, and then sets its value to the number of bytes scanned";;
REGISTERED AS {1 3 18 0 2 4 6 1}.

The two disk drives in this case, disk-1 and disk-2, are represented in the OSI agent by two instances of the "disk" managed object class. When the attribute "checkdisk" for a "disk" instance is set to a value of 1, a command is sent to the actual disk drive to start the consistency checking operation. The command completes when the check is done, and returns the number of bytes scanned. In other words, an OSI set operation on the attribute will only complete after the consistency check is completed, and will return the number of scanned bytes as the "set" value.

In this example, OSI manager 14 sends a single "scoped" CMIP Set request to agent 15, with the instruction to set the value of "checkdisk" attribute to 1 in each instance of "disk" managed object class within the scope. The agent determines the set of instances that fall within the scope (in this example, there are two instances), and issues for each selected instance 16 and 17 the set request, starting each request on a new sub-thread. (Before starting, the agent's main thread checks whether the instance is locked or unlocked). This approach enables both requests to be processed in parallel, i.e. sending the command to disk-1 18 will not block the agent, so that the request to disk-2 19 can also be sent. At the same time, the agent is available to respond to other queries while disk-1 and disk-2 are going through their respective consistency checks. Until the operation is completed, the managed object instances representing disk-1 and disk-2 are locked, and no new CMIP operations on these instances will be permitted to start.

When disk-1 and, respectively, disk-2 complete their consistency checks, the responses to the set (including the new value for the checkdisk attribute) will be returned through agent 15 to manager 14 as a response to the original scoped request. The CMIP set request in this case will result in three responses to be returned to the OSI manager as required by OSI: two linked-replies (each containing the value of the set attribute in each disk instance), and an empty set response, indicating the end of response.

Multithreading Example

Figure 5:
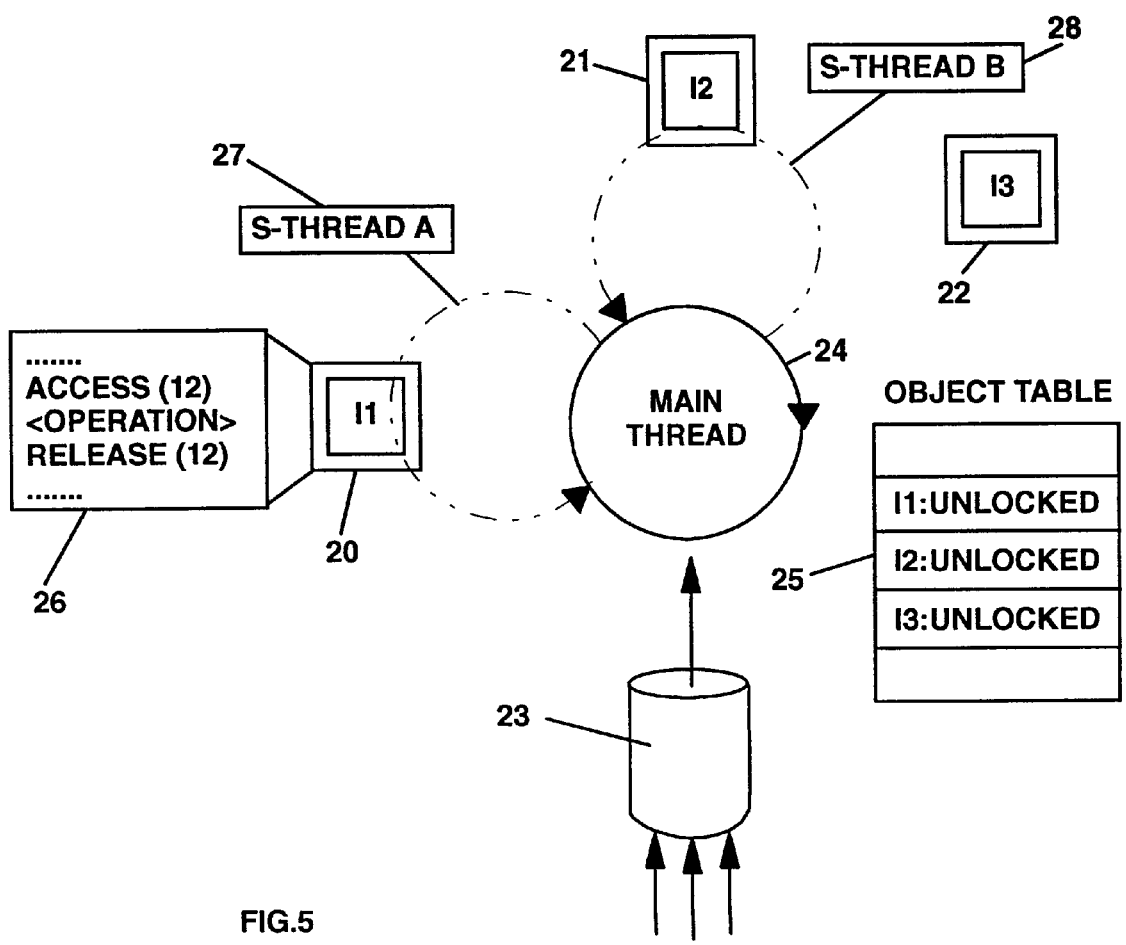
FIG. 5 is a schematic diagram showing the interaction of multiple subthreads as well as an example of the object table used by threads in the agent.

FIG. 5 illustrates an example where multiple sub-threads are operating and one sub-thread has to access or use another object during its execution. FIG. 5 is a block diagram of the OSI agent used in this example. It contains three previously created managed object instances, I1 (20), I2 (21), and I3(22). Requests from one or more OSI managers arrive at input 23 of the agent, and are delivered to main thread 24 sequentially in the order they arrive. These messages are read one at a time by the main thread.

The lock/unlock status of each instance is kept in object table 25. This table is accessible by any thread active in the agent. Note that a locked managed object instance can only be unlocked by the thread that locked it.

In FIG. 5, a code segment 26 is shown from the implementation of instance I1. It is assumed that this segment is executed during the processing of some requests made to I1. This example code accesses instance I2 (it tries to lock it for access), performs the required operation, on completion, releases (unlocks) instance I2.

In the specific example described here, two requests are received by the agent in sequence. The first request, OP1, is destined for instance I1; the second, OP2, is destined for I2. The following steps are executed:

main thread receives OP1 checks whether I1 is locked: it is unlocked;

locks I1; starts sub-thread 27 to process OP1 (sub-thread A)

main thread 24 receives OP2, checks whether I2 is locked: it is unlocked;

locks I2; starts sub-thread 28 to process OP2 (sub-thread B);

sub-thread A enters the code segment shown in FIG. 5. It attempts to access (lock) I2, but I2 is already locked. Sub-thread A is blocked (temporarily).

Sub-thread B completes processing OP2. It asks main thread 24 to release I2, and terminates;

main thread 24 unlocks I2;

sub-thread A can now proceed (the underlying system unblocks sub-thread A: I2 is now locked for sub-thread A).

At the end of the code segment, sub-thread A releases (unlocks) I2;

sub-thread A completes processing OP1. It asks main thread 24 to release I1, and terminates.

Main thread 24 unlocks I1.

This example makes clear that several requests can be handled simultaneously by separate sub-threads if they work on different managed object instances. However, the locking prevents that on any managed object instance, more than one sub-thread can operate.

Figure 6:
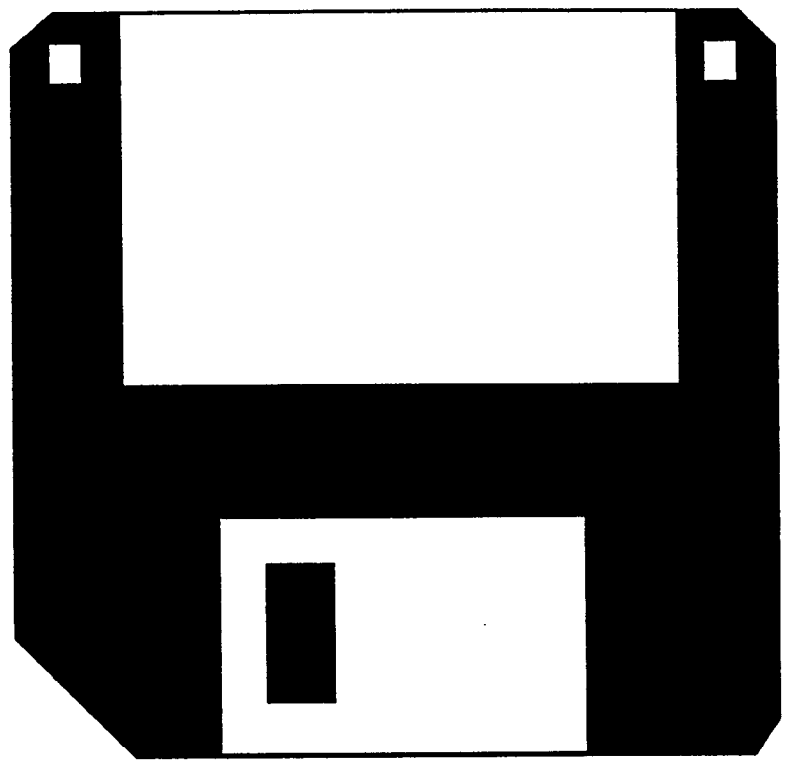
FIG. 6 illustrates a storage device readable by a computer, specifically a floppy diskette used to store program means for distribution.
Figure 7:
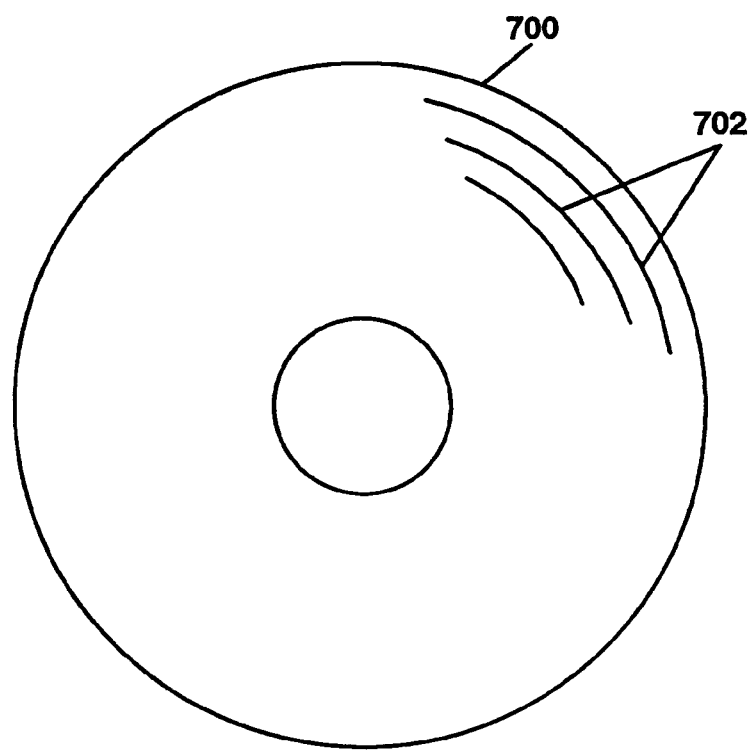
FIG. 7 shows the internal storage medium of the diskette of FIG. 6 on which program means are actually stored.

FIG. 6 shows an illustration of a storage device conventionally used for the commercial distribution of software, including the programs means of the present invention in source or executable format. By way of example, the device of FIG. 6 represents a 3.5 inch square floppy diskette, although it is clear that any means of distribution or storage of software is intended to be covered by this illustration. In the case of floppy diskettes, FIG. 7 shows the actual storage medium that resides inside the device of FIG. 6. 700 is a sheet of flexible plastic material onto which a ferro-magnetic material has been deposited. The magnetic material is formatted into tracks 702 by a formatting program and onto these tracks are defined magnetic positions for the recording of 1's and 0's of source and executable programs. When inserted into a drive receptacle of a computer, the computer is enabled to read the contents of the tracks 702 for the purpose of processing source code or executing the program means of the program or programs stored on the tracks 702. In this particular instance, the storage device of FIG. 6 and its storage medium of FIG. 7 is intended to represent any means of distribution of the program means covered by this invention.

I claim:

1. In an OSI (Open Systems Interconnection) system including:

at least one OSI manager, managed objects executing CMIP (Common Management Information Protocol) requests issued by any said OSI manager, and OSI agents each providing access to plural managed objects, a method for organizing execution of CMIP requests, comprising the following steps:

providing a main thread with each OSI agent;

providing a plurality of sub-threads accessible by said main thread;

for each CMIP request received by an OSI agent, checking by said main thread whether the managed object addressed by said CMIP request is locked and, if the management object is not locked, locking said managed object, sequentially starting a selected one of the sub-threads to process said CMIP request with the following steps:

registering said sub-thread and said managed object, processing said CMIP request, de-registering said sub-thread, unlocking said object when processing of said CMIP request is completed, wherein a plurality of CMIP requests can be executed in parallel simultaneous sub-threads.

2. The method according to claim 1, comprising the following additional steps:

providing a thread manager in each OSI agent for administering sub-threads started by said main thread;

said thread manager maintaining a table registering each active sub-thread and any managed object locked for it.

3. The method according to claim 1, further comprising the following steps:

providing a request queue for the main thread in each OSI agent, and storing any CMIP request received by the respective OSI agent in said request queue when it cannot be handled immediately.

4. The method according to claim 3, further including the following step:

if the main thread, when handling a CMIP request, detects that the managed object addressed by said CMIP request is locked, it returns the respective CMIP request into the request queue.

5. The method according to claim 1, in which said CMIP requests include Get, Set, Create, Delete, Action, and Cancel-Get commands, and if the CMIP request is of the Create command type, the main thread immediately starts a sub-thread for executing the Create request, without intermediate checking and locking steps.

6. The method according to claim 1, including the following steps whenever a sub-thread has to access a managed object other than the managed object initially addressed by, and locked for, itself:

checking by the respective sub-thread whether said other managed object is locked, and if it is not yet locked; locking said other managed object by the respective sub-thread;

executing the required operations in said other managed object; and unlocking said other managed object by the respective sub-thread.

7. A method for processing Common Management Information Protocol CMIP requests comprising the steps of:

(a) providing a main thread with each OSI agent;
providing multiple sub-thread routines accessible by said main thread;

(b) for each CMIP request received by an OSI agent, checking by said main thread whether the managed object addressed by said CMIP request is locked and, if the managed object is not locked locking said managed object;

(c) starting one of the plurality of sub-thread routines to process said CMIP request; and (d) repeating steps (b) and (c) above wherein multiple requests are being processed simultaneously.

8. The method of claim 7 wherein the sub-thread routine further includes the steps of:

registering said sub-thread and said managed object;

processing said CMIP request;

de-registering said sub-thread; and unlocking by said main thread said object when processing of said CMIP request is completed.

9. A program product for use in a computer system comprising:

a recording storage medium;

a computer program recorded on said storage medium, said computer program including indicia for providing a main thread, with each OSI agent, for sequentially starting execution of CMIP requests and a plurality of sub-threads for processing CMIP requests;

for a CMIP request received by an OSI agent, indicia for checking by said main thread whether the managed object addressed by said CMIP request is locked and, if the managed object is not locked, locking said managed object; and sequentially starting a selected one of the sub-threads to process said CMIP request wherein multiple sub-threads are being executed simultaneously to process multiple CMIP requests.

10. The program product of claim 9 further including indicia for registering said sub-thread and said managed object;

indicia for processing said CMIP request;

indicia for de-registering said sub-thread; and indicia for unlocking said object when processing of said CMIP request is completed.

11. The method of claim 7 including the step of simultaneously executing a plurality of sub-threads to process a plurality of CMIP requests.

12. A method for processing Common Management Protocol CMIP requests comprising the steps of:

providing a main thread with each OSI agent;

providing multiple sub-thread routines accessible by said main thread;

receiving the CMIP requests;

for each CMIP request received by an OSI agent, checking by said main thread whether the managed object addressed by said CMIP request is locked and, if the managed object is not locked, locking said managed object; and sequentially starting selected ones of the sub-thread routines wherein multiple sub-thread routines are being executed simultaneously to process multiple CMIP requests simultaneously.

* * * * *